(12) United States Patent
Hemphill et al.

(10) Patent No.: US 8,512,188 B2
(45) Date of Patent: Aug. 20, 2013

(54) DRIVE TRAIN OF A HYBRID VEHICLE AND HYBRID VEHICLE

(75) Inventors: Jeffrey Hemphill, Copley, OH (US); Edmund Maucher, Jeromesville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 135 days.

(21) Appl. No.: 13/180,636

(22) Filed: Jul. 12, 2011

(65) Prior Publication Data
US 2012/0010035 A1 Jan. 12, 2012

Related U.S. Application Data

(60) Provisional application No. 61/363,472, filed on Jul. 12, 2010.

(51) Int. Cl.
*F16H 3/72* (2006.01)

(52) U.S. Cl.
USPC .......................................................... 475/5

(58) Field of Classification Search
USPC ......................... 180/65.6, 65.25, 65.285
See application file for complete search history.

(56) References Cited

U.S. PATENT DOCUMENTS

| | | | | |
|---|---|---|---|---|
| 2,631,476 A * | 3/1953 | Ravigneaux | | 475/154 |
| 6,852,053 B2 * | 2/2005 | Nakano et al. | | 475/5 |
| 7,110,867 B2 * | 9/2006 | Imazu | | 701/22 |
| 7,207,915 B2 | 4/2007 | Oshidari et al. | | |
| 7,455,608 B2 * | 11/2008 | Moeller | | 475/5 |
| 7,609,011 B2 * | 10/2009 | Yatabe et al. | | 318/140 |
| 8,113,976 B2 * | 2/2012 | Abe et al. | | 475/5 |
| 8,197,373 B2 * | 6/2012 | Akutsu et al. | | 475/5 |
| 2008/0142284 A1 * | 6/2008 | Qu et al. | | 180/65.6 |

* cited by examiner

*Primary Examiner* — Dirk Wright
(74) *Attorney, Agent, or Firm* — Simpson & Simpson, PLLC

(57) ABSTRACT

A drive train of a hybrid vehicle comprising an internal combustion engine, a first electric motor including a first rotor, a second electric motor including a second rotor and arranged to be concentric with the first rotor, a gearbox for converting an input torque generated by the first electric motor and/or by the internal combustion engine into an output torque, the second electric motor being arranged such that a torque generated by the said second electric motor is superimposable over the output torque of the gearbox. A first stator is assigned to the first rotor and a second stator is assigned to the second rotor, the first rotor is arranged concentrically with the second rotor and electrically insulated from the second stator. A hybrid vehicle with a drive train as described above.

11 Claims, 3 Drawing Sheets

DRIVE TRAIN OF A HYBRID VEHICLE AND HYBRID VEHICLE

CROSS-REFERENCE TO RELATED APPLICATIONS

This application claims the benefit under 35 U.S.C. §119(e) of U.S. Provisional Application No. 61/363,472 filed Jul. 12, 2010, which application is incorporated herein by reference.

FIELD OF THE INVENTION

The invention relates to a drive drain of a hybrid vehicle including a internal combustion engine, a first electric motor with a first rotor and a second electric motor with a second rotor, the second electric motor arranged to be concentric with the first rotor, a gearbox arranged to convert an input torque generated by the first electric motor and/or by the internal combustion engine into an output torque, the second electric motor arranged such that a torque generated by the latter is superimposable over the output torque of the gearbox.

BACKGROUND OF THE INVENTION

Hybrid vehicles, i.e. vehicles that include both an internal combustion engine and at least one electric motor are known from the prior art. Vehicles of this type are getting more and more important because they are highly efficient in terms of energy consumption.

To reduce the amount of installation space required for the drive train, drive trains have been developed that rely on two electric motors arranged concentrically relative to each other. Such a drive train is described, for instance, in U.S. Pat. No. 7,207,915. However, as described in this document, the two electric motors that are arranged to be concentric relative to each other use a common stator to drive the two separate rotors of the electric motors. Thus control of the drive is simplified in that an input of energy to one of the stators inevitably causes a control operation of the power output of both the first and the second electric motor.

However, in some applications, such a joint control is a disadvantage. In addition, it requires a complex gearbox construction and design to be able to transmit the corresponding torques.

BRIEF SUMMARY OF THE INVENTION

It is an object of the present invention to avoid the disadvantages of the prior art and to provide individual control of the two electric motors while ensuring a compact construction.

In accordance with the invention, this object is attained by a first stator assigned to the first rotor and a second stator assigned to the second rotor, the first stator being arranged to be concentric with the second stator and electrically insulated from the second stator.

As a result, the costs, the weight and the required installation space of the drive train are reduced while at the same time the output and efficiency of the drive train are increased. Additional input shafts and interconnected gearing arrangements may be dispensed with.

Advantageous embodiments of the invention are described in more detail below.

The first stator may advantageously be arranged radially outside the second stator or axially offset relative to the second stator, thus enabling a compact construction or a longitudinal construction of the drive train which require only a narrow installation space.

The first stator and the second stator may advantageously be arranged in a common housing. As a result, only one component is required to shield the two stators of the two electric motors from the environment. Consequently, the weight of the drive train is reduced, a fact which benefits the design of the entire hybrid vehicle as it increases the vehicle's range.

The number of gearing elements may be reduced by constructing the gearbox as a spur gear set or in particular as a planetary gear set. For example, using Ravigneaux or Simpson stages has proved to be particularly advantageous.

If a clutch such as a multi-plate clutch is provided between the gearbox and the internal combustion engine, it is possible to uncouple the internal combustion engine from the rest of the drive train or to clutch it in specifically as desired. The clutch may also act as a overrunning or freewheel clutch or may be designed as an overrunning or freewheel clutch. Starting from a given torque, the clutch or freewheel will slip. At this point it should be noted that if the internal combustion engine directly or indirectly drives the two electric motors, the latter act as generators.

When the first rotor is connected to a first hollow shaft in operative connection inside a second hollow shaft connected to the second rotor, the torques derived from the two rotors can be transmitted via the nested hollow shafts to a receiving element such as an output shaft. Thus the required installation space can be even further reduced.

An additional shaft connected to the internal combustion engine may advantageously be provided inside the first hollow shaft. Thus all shafts that are driven by motors are arranged concentrically and in a nested formation, which means an even further reduction of the installation space.

In this context another advantageous feature is to arrange the additional shaft to be concentric with the first and second electric motors.

The invention also relates to a hybrid vehicle that is of lower weight and of smaller design. This is made possible using a drive train in accordance with the invention as described above.

BRIEF DESCRIPTION OF THE DRAWINGS

The invention will be explained in more detail below based on an exemplary embodiment and with reference to the associated drawings.

DETAILED DESCRIPTION OF THE INVENTION

Figure 1:
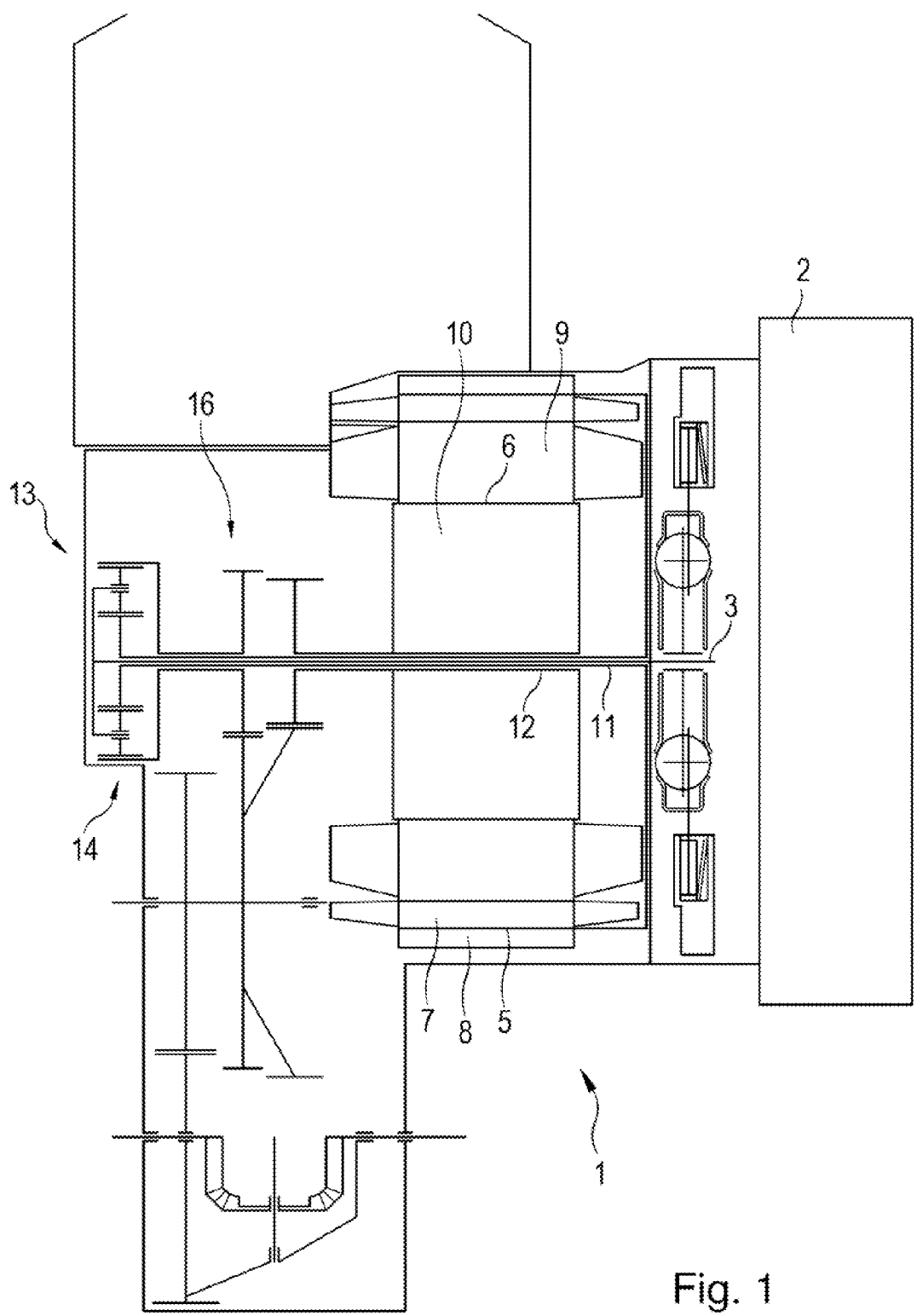
FIG. 1 illustrates a first embodiment of a drive train of the invention.

The figures are of a diagrammatic nature and are exclusively provided for the purpose of making the invention more readily understandable. Like elements are identified by identical reference numerals.

Figure 3:
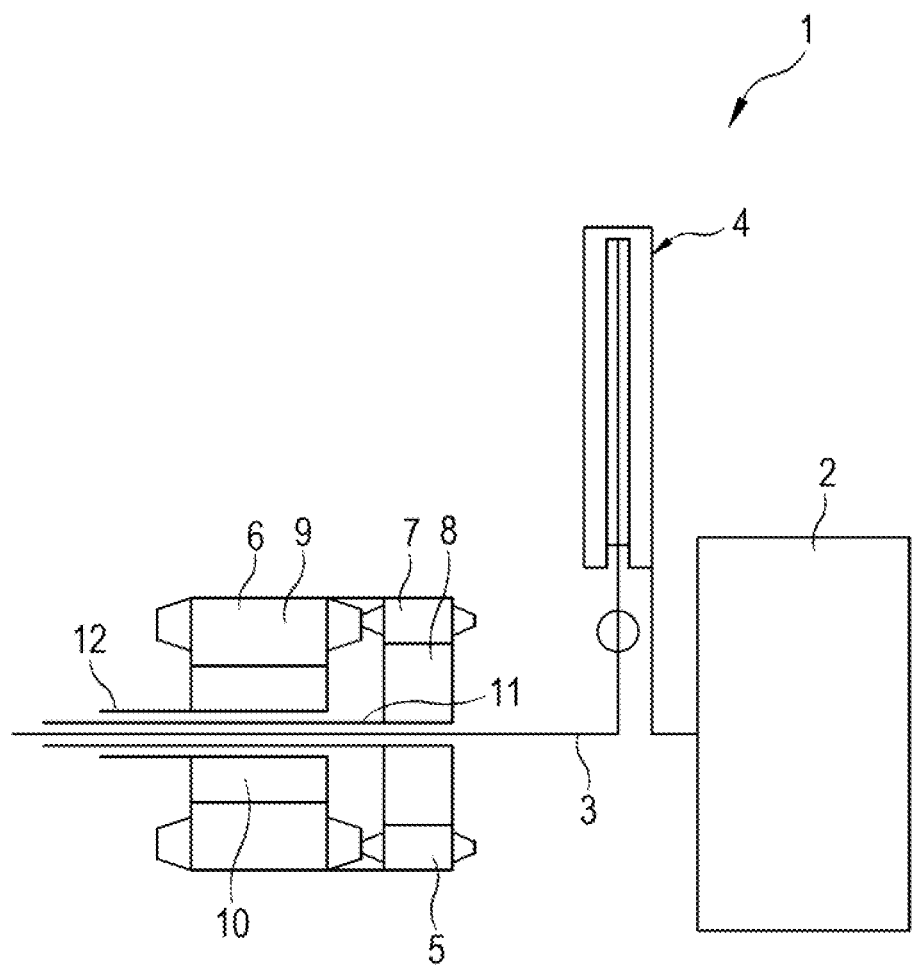

FIG. 1 illustrates a first embodiment of a drive train 1 of the invention. The drive train 1 is used in a hybrid vehicle. An internal combustion engine 2 drives a driven shaft, namely a drive shaft referred to as additional shaft 3 in the present context. A clutch 4 (only shown in FIG. 3) is used to engage and disengage a connection between the internal combustion engine 2 and the additional shaft 3. Starting from a given torque, the clutch 4 may have sufficient slip to act as a freewheel or overrunning clutch.

In addition to the internal combustion engine 2, two electric motors 5 and 6 are provided in the drive train 1. The first electric motor 5 is also referred to as a generator motor, whereas the second electric motor 6 is also referred to as a traction motor. The first electric motor 5 has a first stator 7 and a first rotor 8. The first stator 7 is arranged inside the first rotor 8.

The second electric motor 6 has a second stator 9 and a second rotor 10. The second rotor 10 is arranged inside the second stator 9 and inside the first stator 7 and the first rotor 8. Thus the second electric motor 6 is arranged concentrically inside the first electric motor 5. The two stators 7 and 9 are positionable between solenoids.

The first stator 7 is separated from the second stator 10 by an element acting as an electrical insulator.

The first rotor 8 is connected to a first hollow shaft 11. The second rotor 10 is connected to a second hollow shaft 12. The first hollow shaft 11 is arranged inside and concentrically with the second hollow shaft 12. The additional shaft 3 is likewise arranged inside the first hollow shaft 11 and concentrically with the latter.

The first hollow shaft 11, the second hollow shaft 12, and the additional shaft 3 are connected to a gearbox 13. In the exemplary embodiment shown in FIG. 1, the gearbox 13 is a combined planetary and spur gear set.

Figure 2:
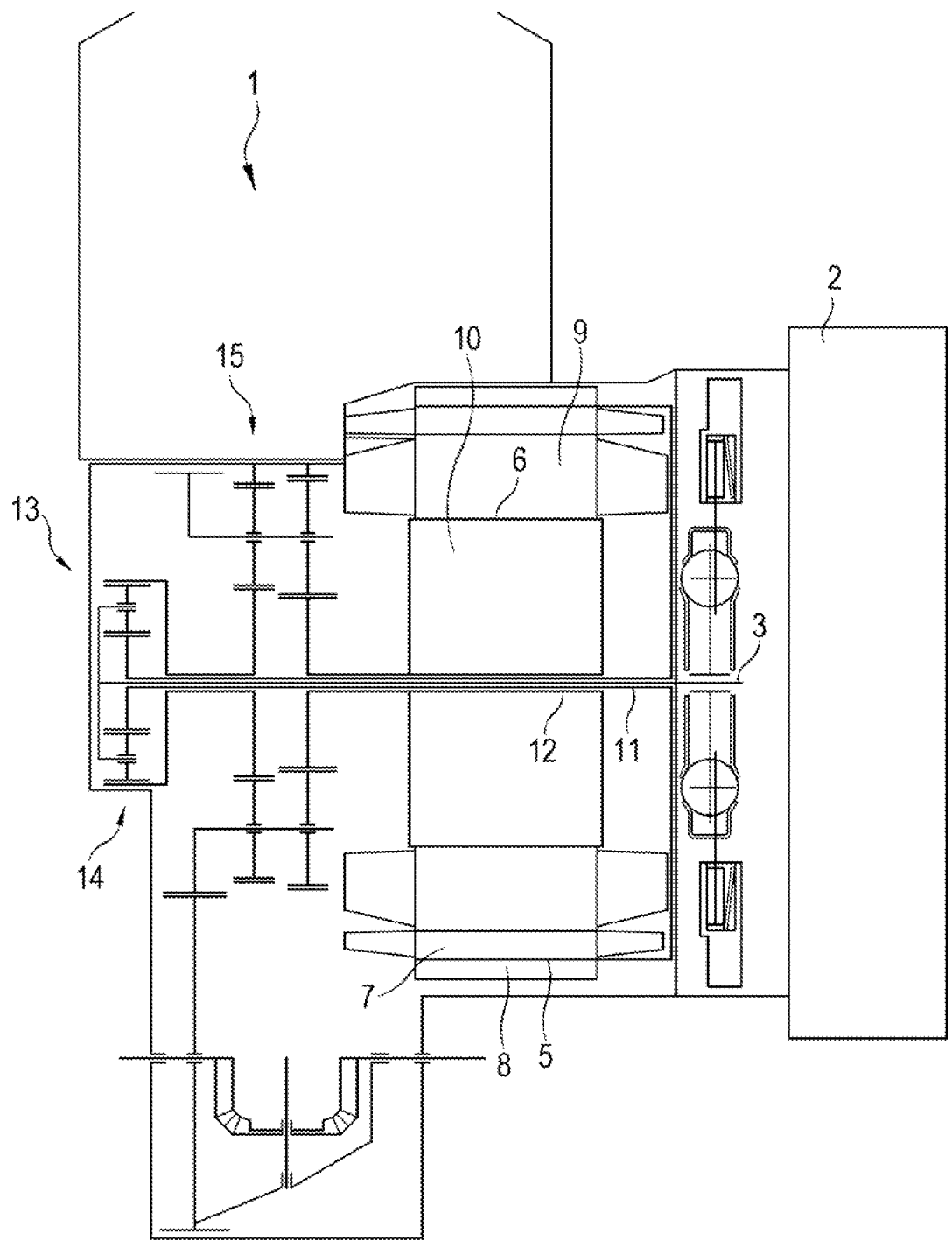
FIG. 2 illustrates a second embodiment of a drive train of the invention; and, FIG. 3 illustrates a third embodiment of a drive train of the invention.

As an alternative to the exemplary embodiment shown in FIG. 1, the embodiment shown in FIG. 2 includes two planetary gear sets 14 and 15 as the gearbox 13 instead of the gearbox design described above. Thus the planetary gear set 15 replaces the spur gear set 16 illustrated in FIG. 1.

In the first two embodiments illustrated in FIGS. 1 and 2, the two rotors, i.e. the first rotor 8 and the second rotor 10, are arranged to be spaced apart from each other in the radial direction. In contrast to this arrangement, in the embodiment shown in FIG. 3, these two elements are spaced apart in the axial direction. Yet in FIG. 3 the two electric motors 5 and 6, i.e. in particular their stators 7 and 9 and their rotors 8 and 10, are likewise arranged about a common axis of rotation.

As a result of the expedient concentric arrangement of the individual elements relative to each other, the entire device requires less installation space. This is a particular advantage of the invention when the stators 7 and 9 are electrically insulated and separated from each other despite their concentric arrangement. Due to this feature, a specific assignment of a stator to an electric motor is made possible.

LIST OF REFERENCE NUMERALS 1 drive train
2 internal combustion engine
3 additional shaft
4 clutch
5 first electric motor
6 second electric motor
7 first stator
8 first rotor
9 second stator
10 second rotor
11 first hollow shaft
12 second hollow shaft
13 gearbox
14 planetary gear set
15 planetary gear set
16 spur gear set

What is claimed is:

1. A drive train of a hybrid vehicle comprising
an internal combustion engine;
a first electric motor including a first rotor;
a second electric motor including a second rotor and arranged to be concentric with the first rotor; and,
a gearbox for converting an input torque generated by the first electric motor or by the internal combustion engine into an output torque, wherein:
the second electric motor is arranged such that a torque generated by the second electric motor is superimposable over the output torque of the gearbox;
a first stator is assigned to the first rotor;
a second stator is assigned to the second rotor;
the first or second rotor is radially inward of the first and second stators; and,
the first stator is arranged concentrically with the second stator and electrically insulated from the second stator.

2. The drive train as set forth in claim 1, wherein the first stator and the second stators are located in a common housing.

3. The drive train as set forth in claim 1, wherein the gearbox is designed as a spur gear set or a planetary gear set.

4. The drive train as set forth in claim 1, wherein a clutch is arranged between the gearbox and the internal combustion engine.

5. The drive train as set forth in claim 4, wherein the clutch comprises a multi-plate clutch.

6. The drive train as set forth in claim 1, wherein the first rotor is connected to a first hollow shaft that is in operative connection inside a second hollow shaft connected to the second rotor.

7. The drive train as set forth in claim 6, wherein an additional shaft is arranged inside the first hollow shaft and is connected to the internal combustion engine.

8. The drive train as set forth in claim 7, wherein the additional shaft is arranged to be concentric with the first and second electric motors.

9. A hybrid vehicle comprising a drive train as set forth in claim 1.

10. A drive train of a hybrid vehicle comprising
an internal combustion engine;
a first electric motor including a first rotor;
a second electric motor including a second rotor and arranged to be concentric with the first rotor; and,
a gearbox for converting an input torque generated by the first electric motor and by the internal combustion engine into an output torque, wherein:
the second electric motor is arranged such that a torque generated by the second electric motor is superimposable over the output torque of the gearbox;
a first stator is assigned to the first rotor;
a second stator is assigned to the second rotor;
the first stator is arranged concentrically with the second stator and electrically insulated from the second stator; and,
the first and second motor are arranged such that:
the second stator is radially outward of the second rotor and radially disposed between the second rotor and the first stator;
the first stator is radially outward of the second stator and radially disposed between the second stator and the first rotor; and,
the first rotor is radially outward of the first stator.

11. A drive train of a hybrid vehicle comprising
an internal combustion engine;

a first electric motor including a first rotor and a first stator;
a second electric motor including a second rotor and a second stator, separate from the first stator;
a first planetary gear set including:
   a first sun gear arranged to receive first torque from an internal combustion engine;
   a planet carrier directly connected to the first rotor;
   a first plurality of planet gears direction connected to the planet carrier; and,
   a ring gear arranged to output a second torque; and,
a second planetary gear set including:
   a second sun gear directly connected to the second rotor to receive third torque from the second motor; and,
   a second plurality of planet gears engaged with the second sun gear and arranged to output a fourth torque, wherein:
the fourth torque is superimposable over the third torque.

* * * * *